(12) United States Patent
Sunalp et al.

(10) Patent No.: US 9,304,327 B2
(45) Date of Patent: Apr. 5, 2016

(54) EYEGLASSES FOR FAR-FIELD VISION CORRECTION

(71) Applicants: Murad A. Sunalp, Tulare, CA (US); Donn K. Harms, Del Mar, CA (US)

(72) Inventors: Murad A. Sunalp, Tulare, CA (US); Donn K. Harms, Del Mar, CA (US)

(*) Notice: Subject to any disclaimer, the term of this patent is extended or adjusted under 35 U.S.C. 154(b) by 25 days.

(21) Appl. No.: 14/203,323

(22) Filed: Mar. 10, 2014

(65) Prior Publication Data

US 2014/0253865 A1    Sep. 11, 2014

Related U.S. Application Data

(60) Provisional application No. 61/775,383, filed on Mar. 8, 2013.

(51) Int. Cl.
| | |
|---|---|
| *G02C 7/02* | (2006.01) |
| *G02C 5/00* | (2006.01) |
| *G02C 1/02* | (2006.01) |
| *G02C 1/00* | (2006.01) |

(52) U.S. Cl.
CPC .. *G02C 7/02* (2013.01); *G02C 1/00* (2013.01); *G02C 1/02* (2013.01); *G02C 5/001* (2013.01)

(58) Field of Classification Search
CPC .............. G02C 1/00; G02C 5/00; G02C 7/00; G02C 7/02; G02C 7/024; G02C 7/025; G02C 2202/06; G02C 1/02; G02C 5/001
USPC ................... 351/41, 61, 110, 159.01
See application file for complete search history.

(56) References Cited

U.S. PATENT DOCUMENTS

| | | | | |
|---|---|---|---|---|
| 1,624,337 | A * | 4/1927 | Halikman | ........................... 2/12 |
| 6,174,059 | B1 * | 1/2001 | Haley | ........................ 351/159.19 |
| 2004/0046930 | A1 * | 3/2004 | Brzozowski | ................... 351/140 |
| 2005/0099593 | A1 * | 5/2005 | Sordjan | .......................... 351/159 |

* cited by examiner

*Primary Examiner* — Huy K Mai
(74) *Attorney, Agent, or Firm* — Donn K. Harms

(57) ABSTRACT

An eyewear device is provided which has lenses positioned above the temples when worn yielding an unobstructed view below the bottom of both lenses. The lower edge of the lenses may be curved toward the upper edge to increase the viewing area and the lenses may be rotationally engaged to temples to allow changes in viewing angle through them.

4 Claims, 3 Drawing Sheets

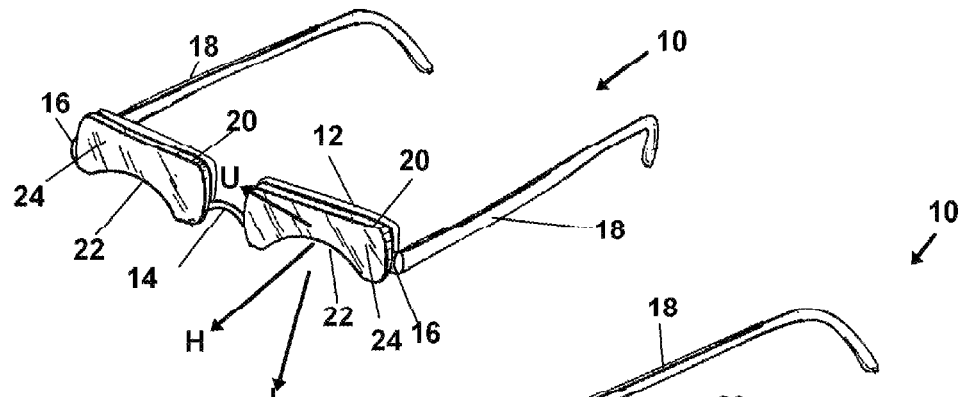
FIG. 1
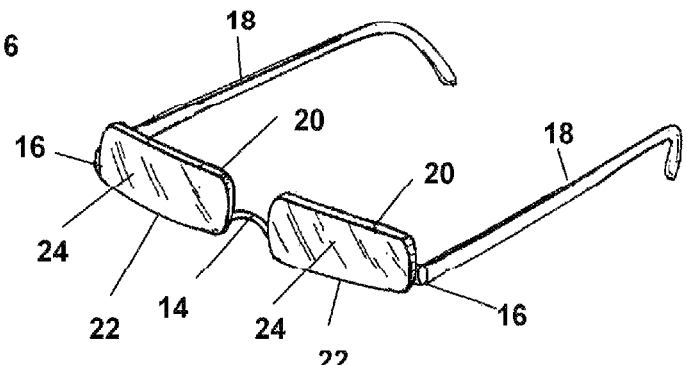
FIG. 2
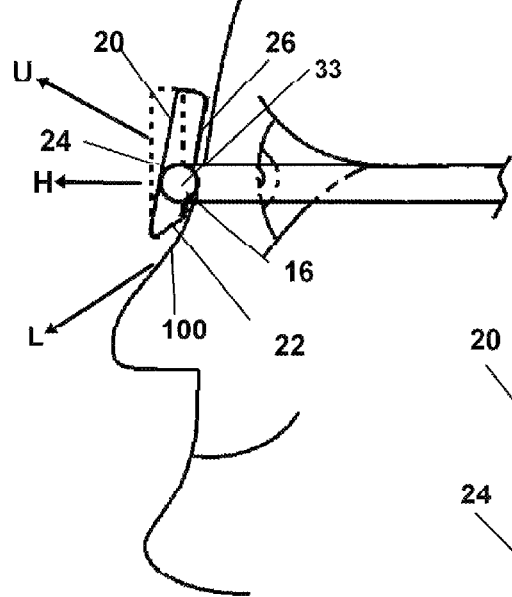
FIG. 3
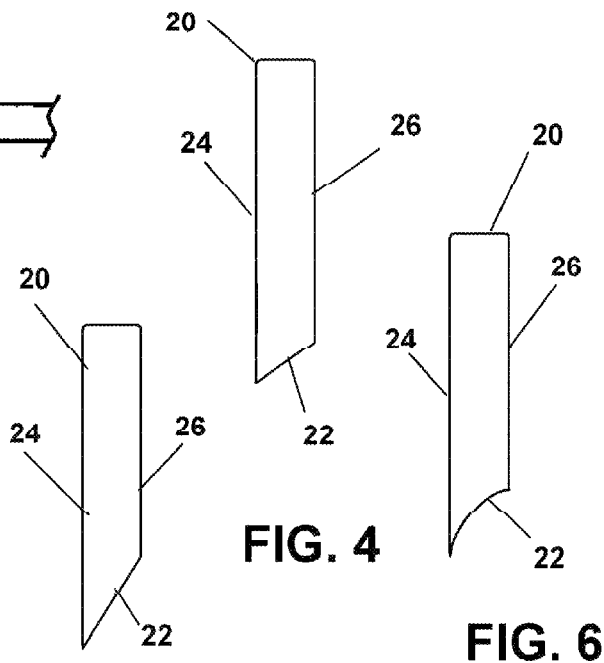
FIG. 4
FIG. 5
FIG. 6

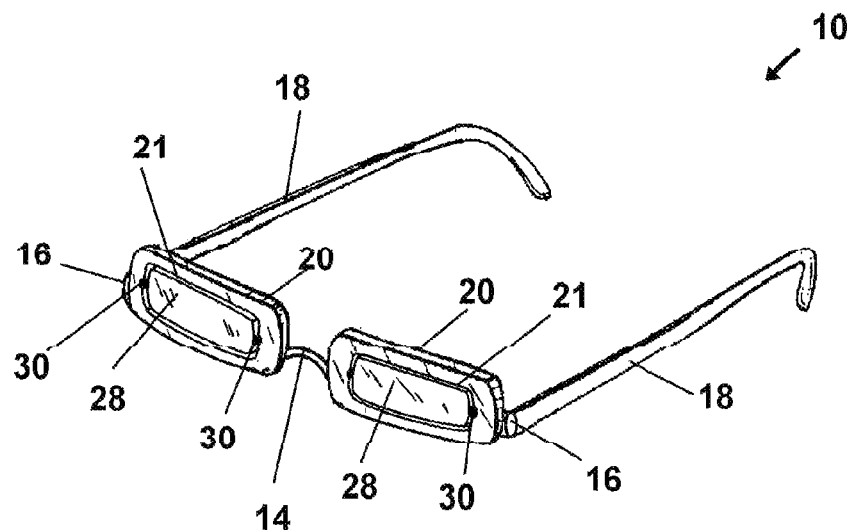
FIG. 7
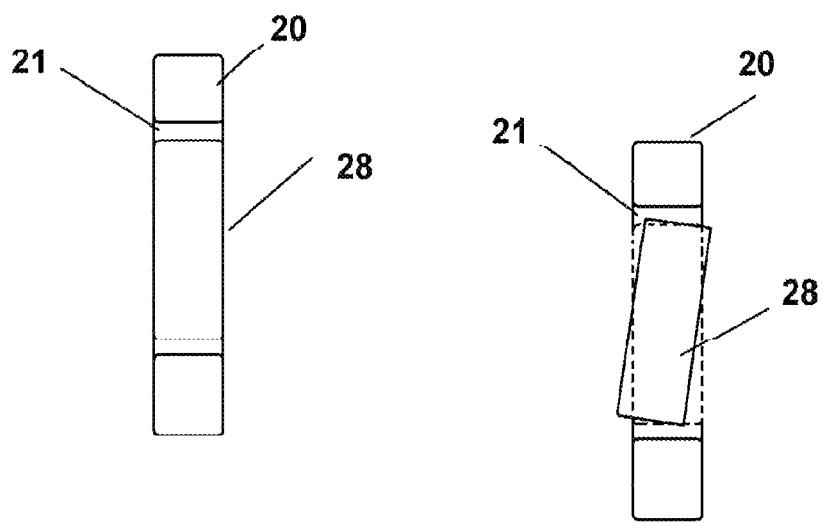
FIG. 8
FIG. 9

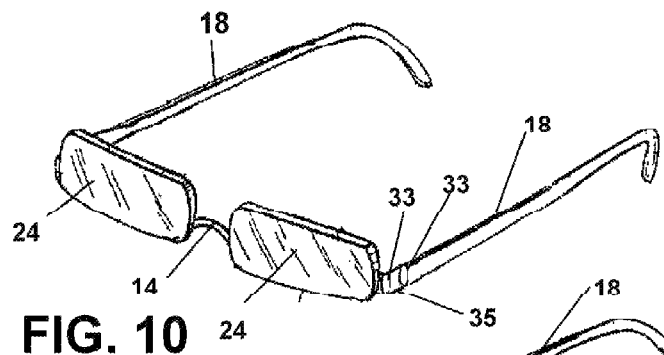
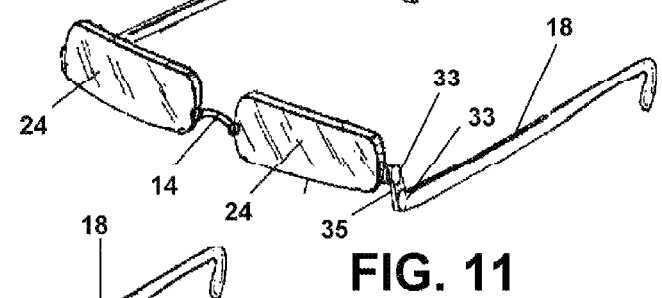
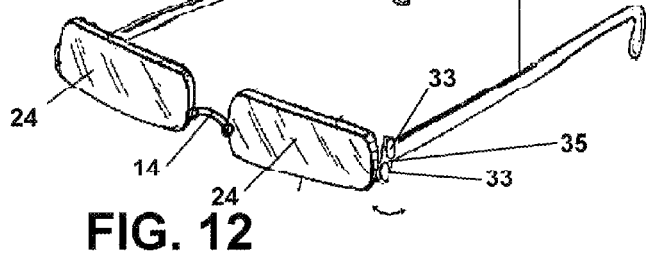
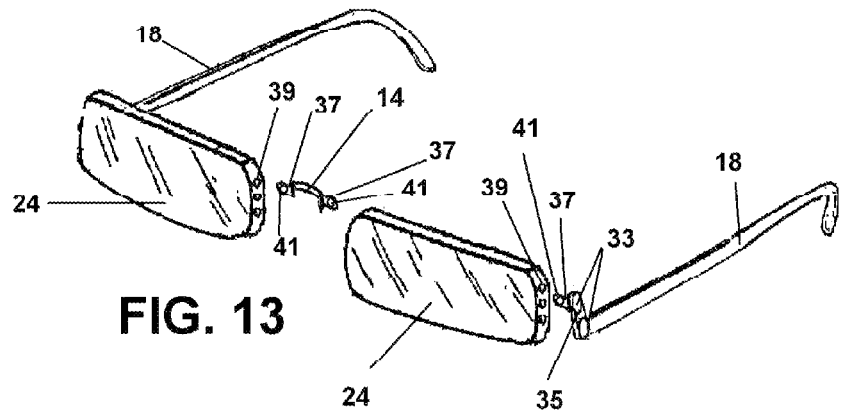

EYEGLASSES FOR FAR-FIELD VISION CORRECTION

This application claims priority to U.S. Provisional Patent Application Ser. No. 61/775,383 filed on Mar. 8, 2013 and which is incorporated herein by its entirety by this reference thereto.

BACKGROUND OF THE INVENTION

1. Field of the Invention

The present invention relates generally to eyeglasses. More particularly the invention relates to an eyeglass device for improving the far field of vision for myopia sufferers, while maintaining the user horizontal line-of-sight and lower field of vision substantially unobstructed.

2. Prior Art

Myopia, more commonly known as nearsightedness, is a condition of the eye which causes distant object to be out of focus, while an object closer to the viewer is in focus. This occurs when light entering the eye through the cornea and lens does not directly focus on the retina but instead converges in front of it. Conventionally, myopia can be corrected through the use of corrective lenses in eyeglasses or contacts. In general, the corrective lens will have a diverging lens, which is a lens with negative optical power (i.e. concave). This compensates for the deficiency by essentially moving the focal length back towards the retina thereby correcting vision.

Many corrective lens types are known in the art. Single vision correction type lenses are the most common lens type and conventionally have a uniform optical correction over the entire area of the lens. Conventionally, single vision lenses are shaped to cover the entire optic or field of vision of the wearer in order to correct deficiencies affecting the entire field. However, half field lenses, which are smaller and sit lower on the nose, are also known and typically employed to correct near field vision deficiencies, which inhibit the ability to see small characters and lines and to read. Such reading glasses generally are a magnifying lens which brings close typeface and small objects into focus for users who are far sighted or just suffer from a lack of close-focus.

Magnifying lenses may cover the entire eye, but most users prefer that their long vision be unobstructed when reading or doing close work with magnifying lenses in their eyeglasses. As such a large majority of magnifying lens eyeglasses which are employed by users for reading and close up work, are half height lenses which are worn on the nose in a manner where the user looking downward as would be the case with reading, can focus on the type on the page being read, through the half lenses in a downward gaze.

In this conventional fashion, with the user viewing substantially downward in their lower field of vision (for example when reading), by using half height lenses in eyeglass frames, the configuration essentially splits the users field of vision in two, with the lower field being corrected by the magnification lenses in the eyeglasses, and the upper field, which is not in line with the lenses, are un-corrected.

Bifocal is another type wherein the field of vision is additionally split into upper and lower sections, however both having corrective lens portions. The upper section of the lens is generally used for far field vision when looking slightly upward, while a lower section is used for near field vision. A user with vision deficiencies in both the upper and lower fields of vision would employ a certain lens power in the upper section for far field vision, while having a different power lens in the lower section for near field vision correction if needed.

However, for some myopia-affected users, or users requiring other correction, conventional single vision and bifocal lenses do not suitably correct their vision, especially in cases where only their far field (upper field) vision is affected, and their near field (lower field) vision is relatively normal and may not need any substantial correction. For instance, single vision lenses which cover the entire field of the wearers vision would cause over-correction and vision problems for the otherwise unaffected near field of vision, while bifocal lenses would simply be unusable since correction of the near field (lower section) is not needed in the first place.

A particular prominent occurrence of this problem is seen in the medical field. Surgeons and other medical professionals are typically required to maintain excellent vision for obvious reasons. In cases where a surgeon has far field vision deficiencies, the need for corrective eyewear to give the professionals the best vision possible is more then obvious. However, in cases where the individual has excellent near field vision, there is an additional obvious need to leave the straight ahead horizontal line of sight and near field of vision unobstructed by the corrective eyewear.

A particular problem exists for surgeons. The surgeon, when performing medical surgical procedures, will typically shift viewing fields from a field view looking downward at a surgical table, to a horizontal line-of-sight viewing when communicating with others who are close by. Further, in modern operating rooms, with overhead visual displays employed for surgery, looking up at the closer-positioned display screens with writing on them as well as a graphic display, diagnostic machinery, can require close-up correction of magnifying lenses using what would be an overhead gaze of the eyes while the surgeon's face is still angled downward toward the surgical site. In the alternative, the straight-ahead viewing may require another type of corrective lens, however the user still requires an unobstructed downward view or gaze at the same time.

As can be ascertained, the need for eyewear providing unobstructed downward viewing for arms length work and the user's eye gaze at a downward angle from the plane of the face, while maintaining corrected vision looking straight ahead, gazing the eyes upward with a downward angled face, is a need unanswered by conventional eyewear.

Prior art has taught some examples of devices which are aimed to solve this problem. U.S. Pat. No. 6,174,059 to Haley teaches eyeglasses configured to provide the wearer a substantial upper vertical corrected field of vision and a substantial lower vertical uncorrected field of vision. The eyeglasses enable the user to see objects at a distance through the lenses and objects that are relatively near through the lower vertical uncorrected field of vision, such as reading relatively fine print. However, these and similar devices fail in providing adequate unobstructed vision when viewing close objects being substantially straight ahead in their horizontal line-of-sight and in the lower field of vision. This can be attributed to the shape and construction of the lenses, which do not facility unobstructed horizontal line-of-sight as well as lower field of vision deemed suitable for medical professionals.

As a result, there is a continuing unmet need for an eyewear device employing corrective lenses which are configured to provide corrected vision on an upward or forward gaze of the eyes, leaving the horizontal and downward gaze or line of sight substantially unobstructed by the corrective lens. Such a device should do so when the user has a face tilted downward but may change their eye gaze from that same downward angle to one upward. Such a device should be especially suitable for myopia affected persons or provide the correction for their forward and upward gaze while leaving the line of sight with a lowered angle of the eyes, unobstructed. Such a device should advantageously provide a means for adjusting the viewing angle of the eyewear lenses as needed for customizing the viewing characteristics in the upper field of vision as deemed suitable by the wearer, such as to match the plane of a video screen. Further, such a device should be configured for easy employment by medical professionals and other individuals where vision quality is of an upmost importance.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of an eyewear device employing uniquely shaped and configured corrective lenses which provides the user with an upper field of vision correction with the face facing downward or in the same plane as their body, while leaving the area adjacent their horizontal line-of-sight to a lower field of vision substantially unobstructed by the corrective lens.

In accordance with a first particularly preferred mode of the invention, the eyewear device comprises a frame for engaging the corrective lens of the invention, which includes conventional temple portions extending therefrom at a lower corner edge rather than the conventional upper corner edge of each lens. The eyewear frame preferably includes a nose bridge portion communicating between two lenses for engaging the users nose in a conventional manner. However, the frame of the invention herein is preferably configured to engage the users nose substantially higher on the nose bridge than is conventionally seen in eyewear devices in prior art.

Thus the device operatively positions the area defined by the circumferences of the lenses substantially in the upper field of the wearers vision, with the lower field substantially unobstructed by the lenses with the user angling their eyes downward from a straight-ahead horizontal plane. In addition, it is preferred that the lenses are of a limited height as to not extend downward from the frame into the lower field of vision.

Preferably, the lenses are substantially rectangularly shaped, having a circumferential edge comprising a top edge, bottom edge, first side edge and second side edge, communicating between a front surface and a rear surface. For clarity in this disclosure, the rear surface will be considered the surface of the lens most adjacent the wearers eyes. In at least one mode, the bottom edge of the lenses is substantially upwardly curved towards the top edge, wherein the apex of the curve is in a substantially central point between two side edges. When worn, this apex point may align with the horizontal line of sight of the wearer, or may be slightly above or below it. In all of the modes however, it is intended that the curvature formed by the bottom edge provides a means for substantially unobstructing the users horizontal line-of-sight.

In addition, means for unobstruction of the lower field of vision is accomplished by forming the bottom edge of the lens having a cross section being substantially downwardly angled from the rear edge corner on the rear surface to front edge corner on the front surface. Thus, when viewing downward in the lower field of vision, the rear edge corner is unobstructed from the wearers view. In this as well as other mode, the bottom edge may be tinted or otherwise formed providing a means for preventing incoming light from reflecting off of the edge thereby providing a more optically correct lens.

Means for adjusting the viewing angle when viewing in the upper field of vision corrected by the lenses are additionally provided. In one mode, this may be accomplished by rotatable engagement means employed at the engagement of the frame to each of the temple portions. A rotatable hinge or ratcheting hinge may be suitable for this purpose. The frame and lenses can then be rotated relative their engagement with the temple portions. Thus the user can vary the angle of the lenses relative the vertical as needed to customize the viewing angle of the lenses when viewing in the upper field of vision.

In another mode, the lens of the device may include a rotatable lens portion, engaged within a central aperture formed in the lens. The rotatable portion preferably comprises a substantially area of the entire lens. The rotatable portion is preferably rotatably engaged within the aperture on pivot points or other rotatable engagement means disposed on opposing side thereof.

It is further envisioned that the frame of the device can be of a 'frame-less' eyewear type, as is commonly known in the art. One skilled in the art will quickly recognize the various modification needed to accomplish such a task. Further, modes employing unitary lenses may also be carried out within the scope of this patent, and are anticipated.

It is briefly noted that upon a reading this disclosure, those skilled in the art will recognize various means for carrying out these intended features of the invention. As such it is to be understood that other methods, applications and systems employing software adapted to the task may be configured to carry out these features and are therefor considered to be within the scope and intent of the present invention, and are anticipated.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 1 shows a view of a first particularly preferred mode of the eyewear device comprising lenses having a bottom circumferential edge being substantially upwardly curved.

FIG. 2 shows another mode of the device wherein the bottom edge of the lens includes a cross sectional profile being downwardly angled from the rear surface to the front surface.

FIG. 3 depicts an as used mode of the eyewear device having rotatable engagement means as the means for engagement of the frame to the temple portions.

FIG. 4 shows a cross sectional view of a preferred mode of the lens having a bottom edge being downwardly angled from the rear surface toward the front surface. The bottom edge in this mode may be tinted.

FIG. 5 shows a cross sectional view of another preferred mode of the lens having a bottom edge being downwardly angled from the rear surface toward the front surface.

FIG. 6 shows a cross sectional view of yet another preferred mode of the lens having a bottom edge being downwardly angled and substantially concave.

FIG. 7 shows another mode of the invention having a rotatable lens portion engaged to the lens for varying the viewing angle through the rotatable portion.

FIG. 8 shows a side cross sectional view of lens of FIG. 7 showing the rotatable portion in a vertical position.

FIG. 9 shows a side cross sectional view of lens of FIG. 7 showing the rotatable portion rotated to a substantial angle relative the vertical.

FIGS. 10-12 show modes of the device having a rotational member for double rotation and means for adjustable positioning of the lens higher and lower relative to the temples.

FIG. 13 shows a mode of the device from FIGS. 10-12 which employs projections configured to engage recesses in the perimeter edge of lenses for a user-chosen height adjustable engagement to the temples and bridge which may be employed with any disclosed mode or embodiment herein.

Other aspects of the present invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-13, wherein similar components are identified by like reference numerals, there is seen in FIG. 1 a first particularly preferred mode of the eyewear device 10 employing uniquely shaped and configured corrective lenses 20 which provides the user with an upper field of vision correction while leaving the area between the horizontal line-of-sight 'H' with their eyes angled along a horizontal line of sight and a lower field of vision 'U' with their eyes angled downward toward their chin, substantially unobstructed by the corrective lens 20.

In accordance with the first particularly preferred mode of the invention, the eyewear device 10 employs means for holding the lenses 20 in operative positioning in front of the user's eyes such as a frame 12 and/or temples. If employed, a means for engagement of the lens 20 to the frame 12 can be any suitable means known such as adhesive or compression fitting of the lenses to the frame 12.

The frame 12 includes conventional temple portions 18 engaged to and extending from engagement points at the side edges of the frame 12 adjacent bottom corners of the lenses 20 when in the as-used mode mounted in front of the user's eyes.

The eyewear frame 12 if employed, may also include a nose bridge portion 14 communicating between two lenses 20 for engaging the users nose 100. The nose bridge portion 14 provides means to support the lenses on the nose bridge. A shown more clearly in FIG. 3, the bridge portion 14 of the invention herein is preferably configured to engage the users nose 100 substantially higher on the nose bridge 100 than is conventionally known in the art of eyewear devices, especially where magnification lenses for close viewing are employed. Thus the device operatively positions optic portion of the lenses 20 substantially at and in the upper field 'U' of the wearers vision, leaving the area below the line 'H' to the lower field 'L' line substantially unobstructed by the lenses 20 and the lower edges of the lense.

Experimentation has found this mode to be especially useful in the operating room for surgery and the like where the surgeon's vision may be optimal when unaided to view the surgical site, but requires correction to view overhead video displays showing media such as internal surgical sites and text. Additionally the surgeon may be angling their face slightly downward.

The lenses 20 are substantially rectangularly shaped, having a circumferential edge running around defining a top edge, bottom edge 22, and side edges, communicating between a front surface 24 and a rear surface 26, relative to the lenses 20 in the as-used position operatively positioned in front of the user's eyes. In the current mode, means for maintaining an unobstructed lower field between 'L' below the straight ahead or horizontal line-of-sight 'H' running normal to the plane of the user's face, is provided by forming the bottom edge 22 of the lenses 20 having a substantial upward curvature or arc in the bottom edge extending toward the top edge of the lens, as depicted in FIG. 1. The apex of the curved edge 22 may be positioned in a substantially central point between the two side edges.

In addition, when worn, this apex point may align with or be slightly above the horizontal line of sight 'H' of the wearers eyes, with the lenses 20 in the as-used position or may be slightly below it. In all of the modes however, it is intended that the curvature extending the bottom edge 22 upward toward the top edge, provides a means for maintaining a substantially unobstructed line of sight in the area between horizontal line-of-sight 'H' and toward add below the line showing the lower field 'L'.

Additional utility of the invention is provided by allowing the user to vary the angle of the lenses 20, relative to the axis of the temple portions 18 which run substantially horizontal and the user's eyes, for improving vision when tilting their eyes and viewing substantially upward into the upper field 'U' of sight, where a monitor or writing or display may be located. In at least one preferred mode, this may be accomplished by employing rotatable means for engagement 33 at the engagement point of the frame 12 or lens 20 if no frame 12 is used, to each of the temple portions 18. In all modes of the device 10 with rotational engagement at the temples, 18 the bridge would also have means for rotational engagement to the lenses to allow rotation thereon which can be done in many ways such as bridge posts engaging with apertures in communication with each lens 20.

A rotatable hinge to allow a rotation of the axis of both lenses 20 which or more preferably a ratcheting hinge 16 which will be maintained as to angle until readjusted may be suitable for this purpose. Thus in this mode of the device 10 the user can vary the angle of the plane or axis of the lenses 20 and frame 12 vertically so as to place the plane of the lenses in the same plane of a flat display overhead thereby yielding the clearest view thereof.

The engagement using means for rotation may be employed with or without the bottom curved edge and can maintain this position as needed to customize the viewing angle of the lenses 20 when viewing substantially upward in the upper field of vision 'U', although the curved bottom edge yields the maximum downward unobstructed view. Experimentation has found that in the operating room with the user's face angled toward a patient or surgical site below their head, that an angling of the lenses 20 to match the plane of a video screen at an upward angle, significantly increases the quality of the communicated image to the eyes therefrom.

FIG. 2 shows another mode of the device 10 showing a substantially frame-less version of the device 10. In this mode, the lenses 20 may be engaged directly to the temple portions by means of operative connection such as hinges 16 at the engagement with the temple portions 18. As shown, the preferred engagement point is at the lower-outside edges of the lenses, proximate to the lower edge, to place substantially the entire area of the lenses 20 defined by their circumference, elevated above the temples and thereby raise the lower edges of the lenses as high as possible. By substantially the entire area is meant most of the area inside the circumference but for a portion running in a line between the width of the opposing temples where they engage the lenses 20.

An other means for means for maintaining an unobstructed lower field of vision 'L' which may be used without or in combination with the curved lower edge, is provided by forming the bottom edge 22 of the lens 20 having a cross section being substantially downwardly angled from the rear surface 26 toward the front surface 24. FIG. 4, FIG. 5, and FIG. 6 show some particularly preferred modes depicting the angled bottom edge 22 having a higher end of the angle, closer to the user's eye when worn in the as-used position, angling toward a lower edge at the front surface of the lens 20. In particular, FIG. 6 shows a mode wherein the bottom edge 22 also has a concave profile which may be preferred to improve the reflective qualities of light reflecting off the bottom edge 22 as needed for maintain optical correctness of the lens 20.

Thus, with the user's eyes directed downward toward the lower field of vision between line 'H' and down toward 'L', the rear surface intersection with the lower edge of the lens 20 is unobstructed from the wearers view angle and they can see more clearly in the lower field 'L'. In this as well as other modes, the bottom edge 22 may be tinted or otherwise formed to provide a means for preventing incoming light from reflecting off of the edge, otherwise light may be reflected by this edge 22 and impair the optical qualities of the lens 20, or may cause light to be directed into the users eyes, and blind them. As such, tinting or otherwise forming the bottom edge to prevent this provides a more optically correct lens 22.

FIG. 7, FIG. 8, and FIG. 9 depict another preferred mode of the device wherein the lens 20 of the device 10 includes a rotatably engaged lens portion 28, engaged within a central aperture 21 communicating between the front and rear surfaces 24, 26 of the lens 20. The rotatable portion 28 preferably comprises a substantially area of the entire area of the lens 20. The rotatable portion 28 is rotatably engaged within the aperture 21 at pivot points 30 or other stable rotatable engagement means disposed on opposing side thereof as clearly shown.

FIG. 8 and FIG. 9 show cross sectional views of the current mode of the device 10 showing the ability to rotate the rotatable portion 28 from a substantially vertical position (FIG. 8), to any position slightly or moderately departed from the vertical axis (FIG. 9).

FIGS. 10-12 show particularly preferred modes of the device 10 having a rotational member 35 having rotational engagements 33 at two ends which provide for the maximum adjustment of both the position above the nose and temples, and the viewing angle in the as-used position. A first of the rotational engagements 33 is with the temple 18 and on the opposite end of a rotational member 35 is a rotational engagement 33 with the lens 24 or frame holding it. So configured, the double rotation of the two rotational engagements 33 allows for multiple positioning of the pair of lenses 24 in height as well as angle, relative to the axis of the temples 18.

As seen in FIG. 10, the rotational member 35 is aligned with the temples 18 however the depicted novel double hinged engagement allows for rotation of the member, to elevate or lower the top edge of the lenses 20, while still allowing the lenses 20 to tilt to accommodate a desired viewing point which may be at an angle to an intended working position. This can occur during surgery for example, where the surgeon is using his hands to manipulate instruments, at arms-length with their face and eyes pointed in the direction of the instruments, but having a video monitor that is at or above eye level. With the head and face angled toward the surgery site, the surgeon must elevate their eyes but not their face to view the overhead monitor. The ability to rotate the lenses 20 higher or lower elevations relative to the line of the temple, on one rotational engagement of the rotational member 35, and, to rotate the position and angle of the lenses themselves relative to the eyes and face, on the other rotational engagement to the rotational member 35, gives the user infinite angular configuration possibilities of the lenses and elevational positioning of the lenses relative to the temples.

In FIG. 11 the lenses 24 are adjusted using the rotation of the rotational member 35 to a height above the axis running along the temples 18 and, both lenses 24 can pivot in their respective rotational engagement 33 to the rotational member 35, to an angle desired by the user. Further, the user is provided with means for adjustable height positioning of the lenses higher and lower relative to the axis of the temples 18, independent of the angle at which they place both lenses 24 relative to the axis of the temples 18 providing for almost infinite customization for nose height, work height, reading angles, and other requirements where the double jointed member 35 allows for adjustment.

FIG. 13 shows a mode of the device from FIGS. 10-12 which employs projections 37 configured with a compressively biased projecting ball 41. The circumference of the projections 37 is dimensioned to solidly engage into any chosen one of a plurality of recesses 39 formed into the perimeter of the lens 24 thereby allowing for height adjustment of the lenses 24 relative to the temples 18 and the bridge 14 relative to the lenses 24. The biased projecting ball 41 will translate into a recess holding it when the projections 37 engage into any chosen recess 39 and be compressed, and thereafter form a biased engagement against the wall defining the recess 39 to hold the engagement. This projection 37 and recess 39 engagement can be employed on the other modes of the device 10 shown in FIGS. 1-13 also to enhance adjustment of the device by the user.

Further, it is noted and anticipated that one skilled in the art may envision other modes employing unitary lenses which may be carried out within the scope of this patent.

This invention has other applications, potentially, and one skilled in the art could discover these. The explication of the features of this invention does not limit the claims of this application; other applications developed by those skilled in the art will be included in this invention.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An eyewear apparatus having lens portions positionable to an as-used position in front of the eyes of a user, comprising:
   a pair of lenses, each lens having a circumference defining an upper edge and a lower edge opposite said upper edge and having respective first side edges and opposing second side edges communicating between said upper and lower edge of each of said pair of lenses;
   said lenses having a first side surface closest to the user's face in the as-used position and having a second side surface opposite said first side surface;
   each said lower edge angling from a first elevation at a respective intersection with said first side surface to a respective intersection with said second side surface at a lower elevation;
   a bridge communicating between respective first side edges of said pair of lenses;
   a pair of temples, one each of said temples in operative communication with an engagement point with a respective one of said lenses proximate to a respective said second side edge of each of said pair of lenses; and
   said engagement point of said temples being proximate to said lower edge of each of said lenses whereby substantially the entire area of each of said lenses defined by said circumference thereof, is positioned above an axis running through both temples with said eyewear in said as-used position, whereby an unobstructed line of sight from said user's eyes in an area between said lower edge of said lenses at said respective intersections with said first side surface of said lenses and said user's face is defined, and a corrected line of sight is formed through said lenses above said lower edge.

2. The eyewear apparatus of claim 1, additionally comprising:
   said lower edge following an arc running between respective said first side edge and said second side edge of both said lenses; and
   said arc having a apex closest to a respective top edge of both said lenses.

3. The eyewear apparatus of claim 1, additionally comprising:
   said engagement point for said operative communication of said temples with said lenses being a first rotational engagement;
   said bridge rotationally engaged with said lenses;
   an axis of said lenses running in-between said first side surface and said second side surface being angularly adjustable rotation of said lenses with said eyewear in said as-used position; and
   said angular adjustment allowing said user to adjust said axis of said lenses to an angle matching a plane of an overhead video display.

4. The eyewear apparatus of claim 3, additionally comprising:
   a member extending between said first rotational engagement at said engagement point of each of said lenses, and a second rotational engagement between said member and a respective one of said temples.

* * * * *